(12) United States Patent
Kosharovsky et al.

(10) Patent No.: US 12,476,905 B2
(45) Date of Patent: Nov. 18, 2025

(54) SYNCHRONIZATION IN DISTRIBUTED COMMUNICATION SYSTEMS

(71) Applicant: DRIVENETS LTD., Raanana (IL)

(72) Inventors: Eliezer Kosharovsky, Kfar Saba (IL); Amir Krayden, Hertzelia (IL); Evgeny Sandler, Herzliya (IL); Ron Cohen, Ness Ziyona (IL)

(73) Assignee: DRIVENETS LTD., Raanana (IL)

( * ) Notice: Subject to any disclaimer, the term of this patent is extended or adjusted under 35 U.S.C. 154(b) by 205 days.

(21) Appl. No.: 18/006,790

(22) PCT Filed: Jun. 29, 2021

(86) PCT No.: PCT/IL2021/050796
§ 371 (c)(1),
(2) Date: Jan. 25, 2023

(87) PCT Pub. No.: WO2022/029755
PCT Pub. Date: Feb. 10, 2022

(65) Prior Publication Data
US 2023/0300068 A1 Sep. 21, 2023

Related U.S. Application Data

(60) Provisional application No. 63/060,276, filed on Aug. 3, 2020.

(51) Int. Cl.
H04L 45/44 (2022.01)
H04L 7/04 (2006.01)

(52) U.S. Cl.
CPC ............ H04L 45/44 (2013.01); H04L 7/04 (2013.01)

(58) Field of Classification Search
None
See application file for complete search history.

(56) References Cited

U.S. PATENT DOCUMENTS 8,817,756 B1 * 8/2014 Hart .................. H04W 74/04
370/442
2008/0075217 A1 3/2008 Ilnicki et al.
(Continued)

FOREIGN PATENT DOCUMENTS

CN 112838944 A 5/2021
JP 2017220914 A 12/2017
(Continued)

OTHER PUBLICATIONS

All Omnya Abdel Rahaman "Lightweight inter-cluster synchronization scheme for femtocell networks". 2013 International Conference on Computing, Electrical and Electronic Engineering (ICCEEE), Ieee, Aug. 26, 2013, pp. 229-231, XP032505864.
(Continued)

Primary Examiner — Anh Ngoc M Nguyen
(74) Attorney, Agent, or Firm — FisherBroyles, LLP; Roger L. Browdy; Ronni S. Jillions

(57) ABSTRACT

A distributed routing system is provided for use in a communication network, wherein the distributed routing system includes at least one cluster comprising a plurality of cluster elements and characterized in that the cluster elements that are used for forwarding communication traffic from among the plurality of cluster elements are synchronized therebetween to a single clock and then synchronized to an external communication element, such as a client clock. Optionally, all the cluster elements that are used for forward communication traffic, are configured to implement IEEE 1588 standard and/or Synchronous Ethernet (Sync-E).

6 Claims, 2 Drawing Sheets

(56) References Cited

U.S. PATENT DOCUMENTS

2014/0281036 A1* 9/2014 Cutler .................. H04J 3/0667
709/248
2021/0194612 A1 6/2021 Johnson et al.

FOREIGN PATENT DOCUMENTS

WO  2011025746 A1  3/2011
WO  2020044334 A1  3/2020

OTHER PUBLICATIONS

Levesque Martin et al.: " A Survey of Clock Synchronization Over Packet-Switched Networks", IEEE Communications Surveys & Tutorials, vol. 18, No. 4 pp. 2926-2947, XP011634948, Feb. 28, 2016.

* cited by examiner

SYNCHRONIZATION IN DISTRIBUTED COMMUNICATION SYSTEMS

TECHNICAL FIELD

The present disclosure relates generally to the field of distributed computing. More specifically, it relates to the operation of a distributed router.

GLOSSARY

ASIC—Application-Specific Integrated Circuit;
eNB—Evolved Node B;
L2—Layer 2;
OOB—Out of band;
PCI—Peripheral Component Interconnect;
PTP—Precision time protocol;
RAN—Radio Access Network;
SDH—Synchronous Digital Hierarchy;
SoC—System on a Chip;
Sync-E—Synchronous Ethernet;
TOD—Time of Day;
NCM—Network Cluster Management;
Control Plane—A logical layer that encompasses all applications related to all the functions and processes that determine which path to use, e.g. the management of the data plane. This definition encompasses among others but not limited to, configuration engines, routing stacks, routing protocols, spanning tree, ldp (Identity Provider), and user-facing services;
PCIe—PCI express; the term refers to a high-speed serial expansion bus standard. It is for example the common motherboard interface for various connections such as Ethernet hardware connections. PCIe includes high maximum system bus throughput, low I/O pin count and small physical footprint, good performance scaling for bus devices, a more detailed error detection and reporting mechanism (Advanced Error Reporting, AER), native hot-swap functionality and hardware support for I/O virtualization; and
White Box—a commodity, being an open or industry-standard compliant hardware for switches and/or routers within the forwarding plane. White boxes provide users with the foundational hardware elements of a network.

BACKGROUND

Cellular systems have always required strict synchronization. Initial implementations relied on transmission systems (such as SDH) as the clock source for the synchronization process. But as SDH networks in RAN architectures are being replaced by packetized networks, SDH systems are no longer applicable. On the other hand, the advances being made in radio technology and the trend of using disaggregated radio system comprising eNB units, create the need for more precise clock distribution systems that can be implemented in such disaggregated radio systems.

The industry standard technologies for clock distribution are based on two main protocols:
a) The Precision Time Protocol (PTP) which is a protocol used to synchronize clocks throughout a computer network. On a local area network, it achieves clock accuracy in the sub-microsecond range, making it suitable for measurement and control systems. This approach provides the option to distribute Phase and Time of day (TOD) information.

The PTP selects a master source of time for an IEEE 1588 domain and for each network segment in the domain. Clocks determine the offset between themselves and their master. In order to accurately synchronize to their master, clocks must individually determine the network transit time of the Sync messages. The transit time is determined indirectly by measuring round-trip time from each clock to its master and the clocks initiate an exchange with their master designed to measure the transit time.

b) Synchronous Ethernet (SyncE) is an ITU-T standard for computer networking that facilitates the transfer of clock signals over the Ethernet physical layer. Such a signal can then be made traceable for an external clock, and provides the option to distribute phase information via a dedicated channel on the ethernet physical layer.

Yet, systems such as 5G cellular systems require synchronization precision at the order of nanoseconds (ns). In turn, to reach such a high precision level on a packetized network, clock correction must be affected at every network node belonging to the system.

Synchronization packet processing in prior art solutions is done at the forwarding ASIC level. Devices referred to as "system on a chip" (SoC) devices work very well when dealing with the problem of synchronization. However, a single chip is limited in the amount of traffic it can forward, hence multichip systems are built. The current approach to building a multichip system is by using a chassis cage that encompasses several line cards, where each line card includes a small number of forwarding chips, interconnected with dedicated fabric cards.

As every chip needs to update the associated clock, all chips comprised in such a chassis cage device, need to have a very good inter-synchronization level between themselves. The chassis cages are proprietary devices, manufactured by using a specialized design. The intra chassis synchronization is achieved by implementing dedicated synchronization lanes, that have been designed as part of the chassis cage during its design phase.

Disaggregated and distributed systems are systems whose components are located on different networked nodes, which communicate and coordinate their actions by forwarding messages to one another. Implementing this concept relies on using commodity hardware, such as white box network devices and commercial off the shelf servers.

While the white box network devices are capable of time synchronization when operating as a stand-alone device, when they are assembled to form a distributed cluster, synchronizing the internal clock between the various cluster components becomes a significant challenge. Clusters are usually deployed to improve performance and availability over that of a single device (e.g., a computer), while typically being much more cost-effective than individual devices of comparable speed or availability. However, cluster computing technique poses a number of challenges. Two of these challenges stand out: the first being application complexity and the second-cluster element synchronization.

The application complexity stems from the distributed nature of cluster computing. For instance, solution architecture must be one that is able to address the question of how can the network elements be used when the task at hand is being divided therebetween, while ensuring that from the customer application's side, it would still appear that it communicates with a single logical unit.

Element synchronization on the other hand relates to the internal cohesiveness of the system. Every datum unit shared between elements must be synchronized to ensure coherence of the cluster-wide behavior.

Therefore, a solution is needed, one that will ensure that:
  a. The cluster components are synchronized to a level needed to meet cellular networks requirements;
  b. The solution should rely on standard components that are available as off the shelf components by commodity hardware vendors.
  c. The system must appear to the outside world as a single node in term of clock mechanisms.

SUMMARY

The disclosure may be summarized by referring to the appended claims.

It is an object of the present disclosure to provide a novel solution for use in a distributed routing system for synchronizing cluster elements that are configured to forward communication traffic.

Other objects of the present disclosure will become apparent from the following description.

According to a first embodiment of the present disclosure there is provided a distributed routing system for use in a communication network, wherein the distributed routing system includes at least one cluster comprising a plurality of cluster elements and characterized in that the cluster elements used for forwarding communication traffic from among the plurality of cluster elements, are synchronized there-between to a single clock and then are all synchronized to an external communication element (e.g. a client clock).

The term "cluster" as used herein throughout the specification and claims is used to denote a set of loosely or tightly connected computing entities that work together so that, in many respects, they can be viewed as a single system. Computer clusters have each node set to perform the same task, controlled and scheduled by software.

According to another embodiment of the present invention, all the cluster elements that are used for forwarding communication traffic, are configured to implement IEEE 1588 standard and/or Synchronous Ethernet (Sync-E).

In accordance with another embodiment, all the cluster elements that are used for forward communication traffic, are configured to be synchronized by using their out of band network as an intra cluster synchronization network.

By yet another embodiment, in case the out of band network comprises a plurality of L2 devices, the plurality of L2 devices are synchronized there-between.

According to still another embodiment, the distributed routing system further comprising a dedicated timing device associated with the cluster elements that are used for forward communication traffic, wherein the cluster elements that are used for forward communication traffic are directly connected to an out of band management network.

In accordance with yet another embodiment, the native management ports of the cluster elements that are used for forward communication traffic, are characterized in that they do not support needed features for affecting a synchronization.

BRIEF DESCRIPTION OF THE DRAWINGS

The accompanying drawings, which are incorporated herein and constitute a part of this specification, illustrate several embodiments of the disclosure and, together with the description, serve to explain the principles of the embodiments disclosed herein.

DESCRIPTION OF EXEMPLARY EMBODIMENTS

Some of the specific details and values in the following detailed description refer to certain examples of the disclosure. However, this description is provided only by way of example and is not intended to limit the scope of the invention in any way. As will be appreciated by those skilled in the art, the claimed method and device may be implemented by using other methods that are known in the art per se. In addition, the described embodiments comprise different steps that are carried out, not all of which are required in all embodiments of the invention. The scope of the invention can be summarized by referring to the appended claims.

The present invention aims to provide a solution whereby a cluster comprising a plurality of components are synchronized to a level needed to meet cellular networks requirements.

One of the underlying principles of the present disclosure is to create two synchronization planes. One plane is an internal plane to the cluster, and is used to synchronize all the forwarding components that are part of the cluster. In such a way it becomes possible to apply a correct and consistent time stamping to all the Sync packets in the cluster forwarding components. Accurate time stamping makes it possible to account for the time errors introduced by the fact that a cluster configuration is implemented.

Once all the cluster components are synchronized to the internal plane, the cluster managing entity is ready to provide the cluster members with synchronization signals received from the external clients while enabling synchronization of the cluster members at a level of 5G grade (i.e., at the order of nanoseconds), by achieving an accurate time stamping of the forwarding components.

Preferably, all the cluster components are synchronized to the internal plane by implementing standard synchronization technologies such as the standard IEEE 1588 and Synchronous Ethernet (Sync-E). The control plane master of the cluster in this example becomes the source for the clock for the cluster members.

Figure 1:
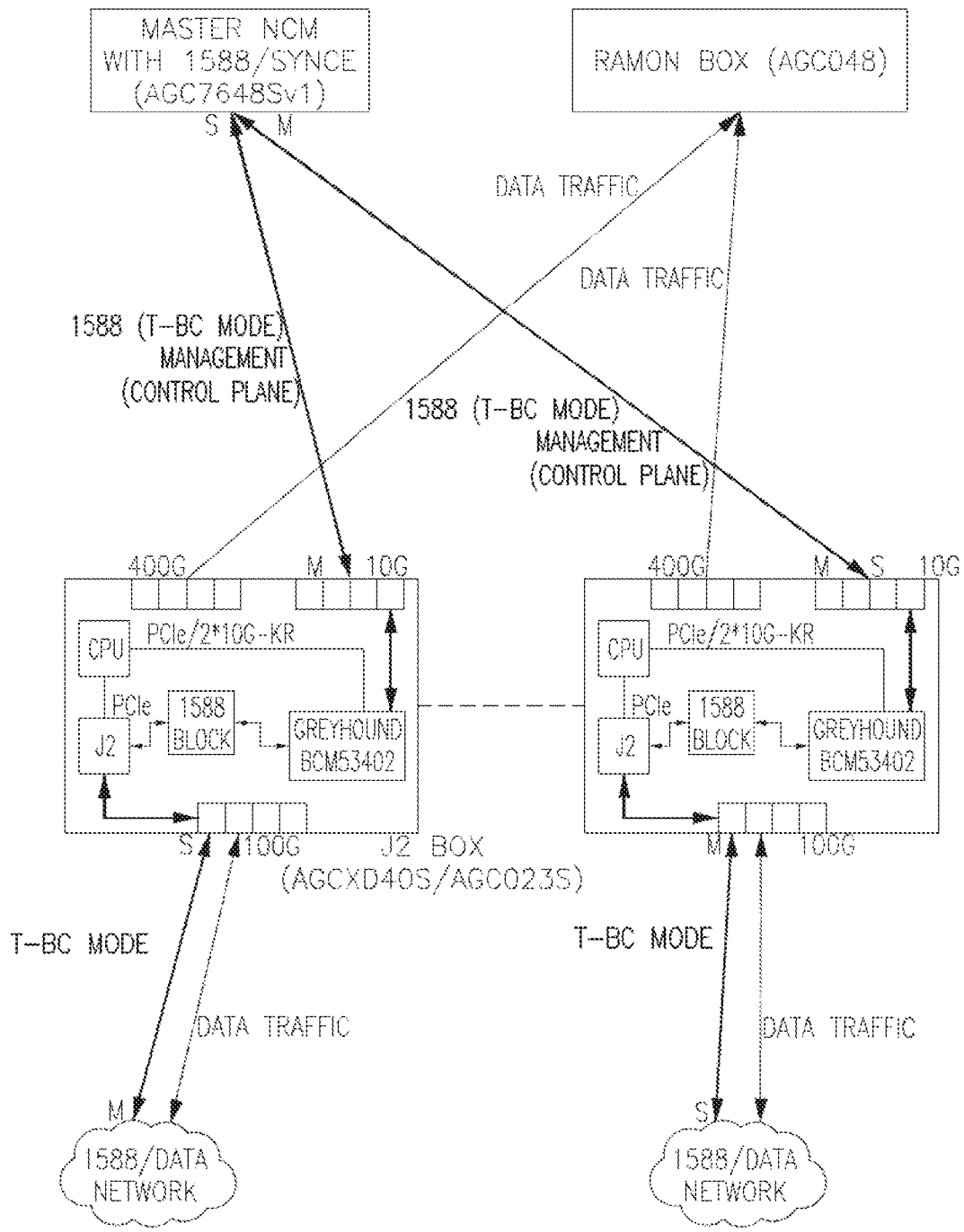
FIG. 1 illustrates a distributed routing system construed in accordance with one embodiment of the present disclosure, wherein cluster elements comprised in the distributed routing system, are synchronized to the internal plane by implementing a communication standard.

There are various ways to implement the above, for example:

Since distributed clusters have Out of band (OOB) management network, according to this example it is suggested to use that OOB network as an intra cluster synchronization network. All the elements belonging to the OOB network need to support Sync-E technology and must be IEEE 1588 aware. If the OOB network is composed of several L2 devices, they must support synchronization as well, as illustrated in FIG. 1.

Figure 2:
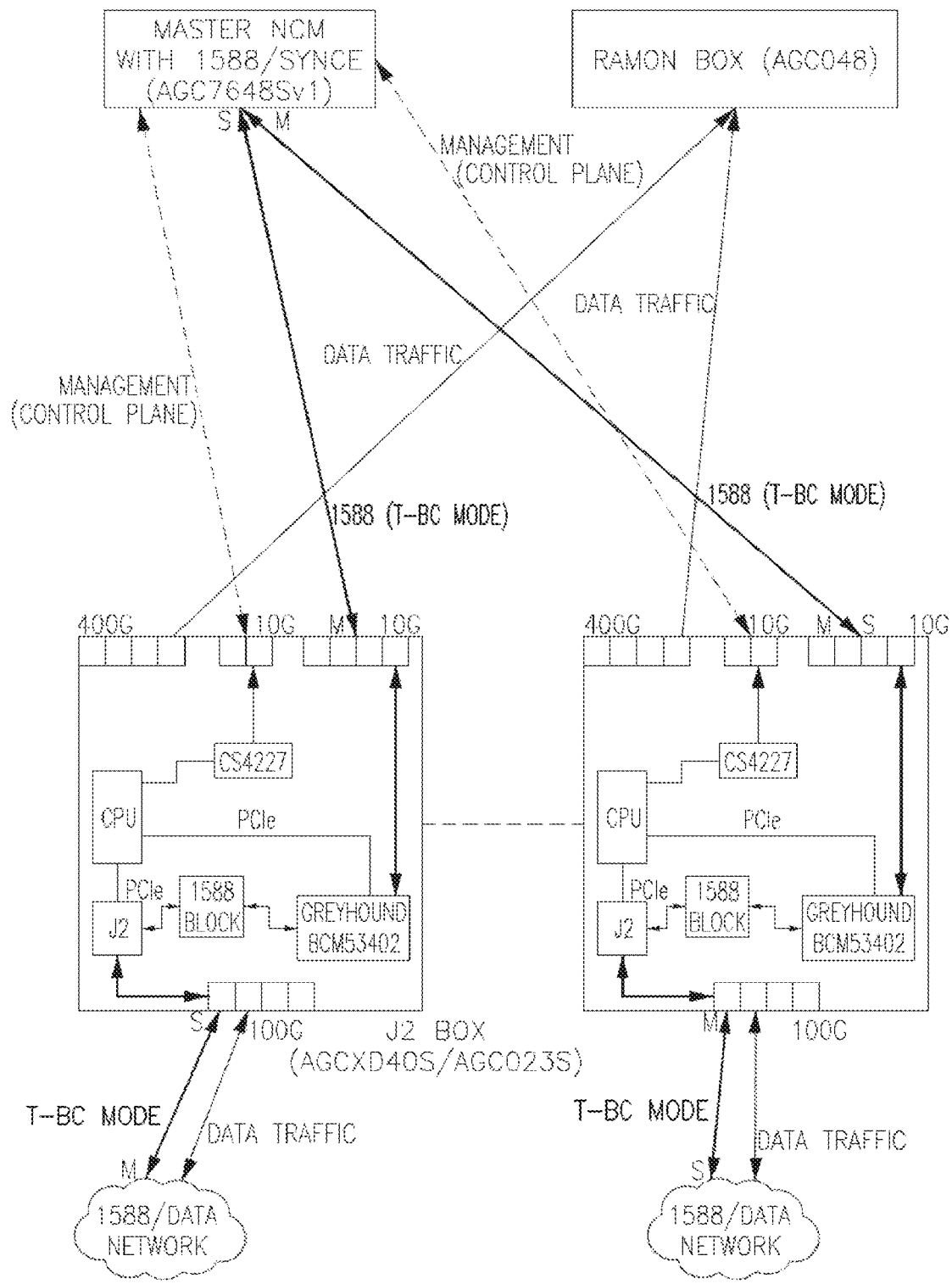
FIG. 2 illustrates a distributed routing system construed in accordance with another embodiment of the present disclosure, wherein cluster elements comprised in the distributed routing system, are synchronized to the internal plane by implementing a communication standard.

According to a second example, a method is provided by which a dedicated timing device is associated (added) with the forwarding components and they are directly connected to the OOB management network. Such an example of implementation may be useful in case where the forwarding components native management ports do not support the needed features for affecting the timing process. This example is illustrated in FIG. 2.

The exact methodology for carrying out a synchronization process such as Sync-E and IEEE 1588, is known in the art per se.

Let us now consider an example of the steps that may be taken while establishing a cluster.

An external synchronization network is connected to the cluster by the use of customer facing ports or by using dedicated sync ports on the cluster control plane master. The letters "M" and "S" depicted in both FIGS. 1 and 2 denote respectively "Master" and "Slave" port roles for implementing IEEE 1588 process and/or Sync E process.

Once a cluster is initialized, the main oscillator of the system (residing on the control plane master) is in a "free run" state, and the devices comprised in the white boxes are completely non-synchronized and are configured to ignore at this stage the Sync related packets. Once the packets reach the main oscillator, the main oscillator begins to align the phase and the TOD to the clock source, and starts synchronizing the devices comprised within the white boxes. As the overall accuracy of the synchronization process increases—the devices comprised in the white boxes start a time stamping process of the packets. Implementing the time stamp procedure allows the main system oscillator to reach a higher accuracy of synchronization and better synchronization of the white boxes. The process continues until the internal synchronization plane enables the overall synchronization plane to reach the needed (pre-defined) accuracy levels.

The master NCM depicted in both Figs. is the network cluster managing element, which is an Out Of Band (OOB) L2 networking component which is configured to manage distributed clusters.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A distributed routing system for use in a communication network, wherein said distributed routing system includes at least one cluster comprising a plurality of cluster elements, wherein said distributed routing system is characterized in that only cluster elements used for forwarding communication traffic from among the plurality of cluster elements are synchronized there-between to a single clock so that a correct and consistent time stamping is applied to all sync packets in the cluster elements used for forwarding communication traffic, and then said plurality of cluster elements are synchronized to an external communication element.

2. The distributed routing system of claim 1, wherein all the cluster elements that are used for forwarding communication traffic, are configured to implement IEEE 1588 standard and/or Synchronous Ethernet, Sync-E.

3. The distributed routing system of claim 2, wherein all the cluster elements that are used for forwarding communication traffic, are configured to be synchronized by using their out of band network as an intra cluster synchronization network.

4. The distributed routing system of claim 3, wherein in case the out of band network comprises a plurality of Layer 2 devices, said plurality of Layer 2 devices are synchronized there-between.

5. The distributed routing system of claim 1, further comprising a dedicated timing device associated with the cluster elements that are used for forwarding communication traffic, wherein said cluster elements that are used for forwarding communication traffic are directly connected to an out of band management network.

6. The distributed routing system of claim 1, wherein the native management ports of the cluster elements that are used for forward communication traffic are characterized in that the native management ports do not support needed features for affecting a synchronization.

* * * * *